United States Patent Office 2,748,090
Patented May 29, 1956

Re. 24568

2,748,090
MANUFACTURE OF SOLID POLYMERIZATION CATALYSTS

Charles H. Watkins, Western Springs, Ill., assignor to Universal Oil Products Company, Des Plaines, Ill., a corporation of Delaware No Drawing. Application February 28, 1955,
Serial No. 491,188

13 Claims. (Cl. 252—433)

This invention relates to the manufacture of solid catalysts which are useful in accelerating various reactions among organic compounds, and particularly reactions involving unsaturated organic compounds.

More particularly this invention relates to the preparation of a particular type of an improved catalyst which is active in accelerating direct olefin polymerization reactions.

An object of this invention is to provide a process for preparing an improved solid polymerization catalyst which is utilizable in promoting hydrocarbon conversions.

A further object of this invention is to provide an improved solid catalyst which is useful in the polymerization of olefinic hydrocarbons by mixing a salt of a metal of group VIII of the periodic table with an acidic oxide of phosphorus, adding said mixture to a solid adsorbent and treating the resultant composite with a boron halide, said catalyst being possessed of a relatively high degree of activity.

One embodiment of this invention resides in a process for the manufacture of a solid polymerization catalyst which comprises admixing a metal salt with an acidic oxide of phosphorus, adding said mixture to a solid adsorbent, drying and calcining said composite, and treating the resultant composite with a boron halide.

A specific embodiment of the invention resides in a process for the manufacture of a solid polymerization catalyst which comprises admixing an aqueous solution of a salt of a metal of group VIII of the periodic table with phosphoric acid, adding said mixture to a solid adsorbent, drying and calcining said composite, and treating the resultant composite with boron trifluoride.

Another specific embodiment of the invention resides in a process for the manufacture of a solid polymerization catalyst which comprises mixing an aqueous solution of a salt of a metal of group VIII of the periodic table with a solid adsorbent material, drying and calcining said composite, and treating the resulting composite with boron trifluoride.

A more specific embodiment of the invention is found in a process for the manufacture of a solid polymerization catalyst which comprises admixing an aqueous solution of nickel nitrate with phosphoric anhydride, adding said mixture to an aqueous slurry of alumina, adjusting the pH of resultant composite by means of ammonium hydroxide to a value in the range of about 7 to about 10, drying and calcining said composite at a temperature in the range of from about 600° to about 1200° F. for a period of time in the range of from about 1 to about 8 hours, and treating the resultant composite with boron trifluoride.

Other objects and embodiments of the invention will be referred to in the following further detailed description of the invention.

The use of a solid phosphoric acid catalyst (a phosphoric acid plus a solid carrier) to polymerize propylene and higher molecular weight olefins only is known. Likewise BF$_3$ supported by an inorganic oxide such as alumina is known to polymerize propylene and higher olefins. A metal of group VIII of the periodic table such as nickel, composited with a solid carrier such as alumina, has very little polymerization activity, while a nickel salt of phosphoric acid on alumina polymerizes ethylene primarily and the higher molecular weight olefins to a lesser extent.

It has now been discovered that the activity of solid catalysts in direct olefin conversion reactions such as the polymerization of like olefins or the copolymerization of unlike olefins (ethylene plus propylene and higher molecular weight olefins) may be raised by preparing the catalyst composite from the mixture of an acidic oxide of phosphorus, a metal salt and a solid adsorbent material, and treating the resultant composite with a boron halide such as boron trifluoride.

In the process of the present invention the starting material for the catalytic compounds will comprise an acidic oxide of phosphorus such as phosphoric pentoxide, orthophosphoric acid, pyrophosphoric acid, triphosphoric acid, tetraphosphoric acid; a salt of a metal of group VIII of the periodic table and a solid adsorbent material, the metal salt and the acidic oxide of phosphorus being admixed before compositing with the solid adsorbent.

In the process of this invention the salt of the metal of group VIII of the periodic table such as nickel chloride, nickel nitrate, nickel sulfate, etc., ferric chloride, ferric nitrate, ferric sulfate, cobalt nitrate, cobalt sulfate, cobalt chloride, the aforesaid salts of platinum, palladium, ruthenium, rubidium, osmium, iridium, etc., are dissolved in water. The previously decided upon acidic oxide of phosphorus in an aqueous medium is then added to this solution.

A solid adsorbent material or carrier for the phosphoric acid-metal salt catalyst may include inorganic metal and metallic type oxide compositions such as silica, alumina, zirconia, magnesia, thoria, boron oxide, etc., combinations of these oxides such as silica-alumina, silica-zirconia, silica-alumina-zirconia, silica-magnesia, silica-alumina-magnesia, silica-thoria, alumina-boron oxide, etc.; materials of predominantly siliceous character such as diatomaceous earth, kieselguhr, artificially prepared porous silica, etc., naturally occurring substances such as fuller's earth, clays such as bentonite, montmorillonite, acid-treated clays, etc. Each adsorbent or supporting material which may be used will exert its own specific influence upon the net effectiveness of the composites and will not necessarily be identical with that of other members of the class.

An aqueous slurry is prepared by adding water to the selected adsorbent material, after which the previously prepared solution of the salt of the metal of group VIII of the periodic table and phosphoric acid is added thereto. After a predetermined length of time, the pH of the resulting composite may, if so desired, be adjusted to a value in the range of from about 7 to about 10, preferably in the range of from about 8 to 9, by means of a basic compound, said compounds including the hydroxides, carbonates, acetates, etc., of alkaline earth and alkali metals such as calcium, barium, strontium, lithium, rubidium, sodium, potassium and magnesium. In addition to the aforementioned alkaline substances, ammonium hydroxide may also be used.

The composite thus formed is then dried at elevated temperatures ranging from about 200° to about 400° F. after which the composite is extruded by suitable means, for example, a hydraulic press, and calcined at temperatures ranging from about 600° to about 1200° F. for a period of time ranging from about 1 to about 8 hours to form a substantially solid granular catalytic material. The calcination of the formed particles of catalyst is usually carried out in an atmosphere of inert gases such as air, nitrogen, flue gas, and the like.

The resultant dried and calcined composite is then treated with a boron halide such as boron trifluoride. Boron tribromide or boron trichloride may also be used, although not necessarily with equivalent results.

It has also been discovered that a catalyst in which the acidic oxide of phosphorus is omitted may also be used to copolymerize olefins. This catalyst may be prepared in essentially the same manner as one in which the acidic oxide of phosphorus is included by admixing the salt of a metal of group VIII of the periodic table with a solid support, drying and calcining the resultant composite, followed by the step of treating the resultant mixture with boron trifluoride.

One of the ingredients of the solid catalysts which are manufactured by the process of this invention for use in organic reactions is an acidic oxide of phosphorus, preferably one in which the phosphorus has a valence of 5. Of the various acids of phosphorus, orthophosphoric acid ($H_3PO_4$) and pyrophosphoric acid ($H_4P_2O_7$) find general application in the primary mixtures, due mainly to the cheapness and to the readiness with which they may be procured, although the invention is not restricted to their use, but may employ any of the other acids of phosphorus insofar as they are adaptable. However, it is not intended to infer that the different acids of phosphorus which may be employed will produce catalysts which have identical effects upon any given organic reactions as each of the catalysts produced from different acids and by slightly varying procedures will exert its own characteristic action.

In using orthophosphoric acid as one of the primary ingredients, different concentrations of the aqueous solutions may be employed, for example, acid containing from approximately 75 to 100% $H_3PO_4$ or orthophosphoric acid containing some free phosphorus pentoxide may be used. By this is meant that the ortho acid may contain a definite percentage of the pyro acid corresponding to the primary phase of dehydration of orthophosphoric acid. Within these concentration ranges, the acids will be liquids of varying viscosities and readily mixed with solid adsorbents.

Triphosphoric acids which may be represented by the formula: $H_5P_3O_{10}$ may also be used as one of the starting materials for the preparation of the catalyst of this invention.

A phosphoric acid mixture which is generally referred to as polyphosphoric acid may also be employed in this process. Polyphosphoric acid is formed by heating orthophosphoric acid or pyrophosphoric acid or mixtures thereof in suitable equipment such as carbon lined trays heated by flue gases or other suitable means to produce a phosphoric acid mixture generally analyzing from about 79% to about 85% by weight of $P_2O_5$. Such a liquid mixture of phosphoric acids with 79.5% $P_2O_5$ content was found by analysis to contain 24.5% of orthophosphoric acid ($H_3PO_4$), 45.2% of pyrophosphoric acid ($H_4P_2O_7$), 26.0% of triphosphoric acid ($H_5P_3O_{10}$), and 4.3% by weight of unidentified phosphoric acids. Another polyphosphoric acid mixture somewhat more concentrated than the one just referred to and having a $P_2O_5$ content of 84% by weight was found by analysis to contain about 57% by weight of triphosphoric acid ($H_5P_3O_{10}$), 17% by weight of hexametaphosphoric acid ($HPO_3)_6$, 11% by weight of pyrophosphoric acid ($H_4P_2O_7$), 5% by weight of orthophosphoric acid ($H_3PO_4$) and 10% by weight of unidentified phosphoric acids.

Another acid of phosphorus which may be employed in the manufacture of a composite catalyst according to the present invention is tetraphosphoric acid. It has the general formula: $H_6P_4O_{13}$ which corresponds to the double oxide formula: $3H_2O \cdot 2P_2O_5$, which in turn may be considered as the acid resulting when three molecules of water are lost by four molecules of orthophosphoric acid, $H_3PO_4$. The tetraphosphoric acid may be manufactured by gradual or controlled dehydration or heating of orthophosphoric acid and pyrophosphoric acid or by adding phosphoric pentoxide to these acids in proper amounts. When the latter procedure is followed, phosphoric anhydride is added gradually until it amounts to 520% by weight of total water present. After a considerable period of standing at ordinary temperature, the crystals of the tetraphosphoric acid separate from the viscous liquid and it is found that these crystals melt at approximately 93° F. and have a specific gravity of 1.1886 at a temperature of 60° F. However, it is unnecessary to crystallize the tetraphosphoric acid before employing it in the preparation of the solid catalyst inasmuch as the crude tetraphosphoric acid mixture may be directly incorporated with the solid siliceous adsorbent.

In addition to the aforementioned acids of phosphorus the anhydride of the phosphoric acids (phosphorus pentoxide) may also be used per se, without first preparing an acid.

The resulting catalyst which has been prepared according to the aforementioned process is active for promoting the polymerization of olefinic hydrocarbons, particularly for polymerizing like normally gaseous olefinic hydrocarbons or copolymerizing unlike normally gaseous olefinic hydrocarbons to form normally liquid hydrocarbons suitable for use as constituents of gasoline. When employed in the conversion of olefinic hydrocarbons into polymers, the calcined catalyst formed as hereinbefore set forth, is preferably employed as a granular layer in a heated reactor which is generally made from steel, and through which the preheated hydrocarbon fraction is directed. Thus, the solid catalyst of this process may be employed for treating mixtures of olefin-containing hydrocarbon vapors to effect olefin polymerization, but the same catalyst may also be used at operating conditions suitable for maintaining liquid phase operation during polymerization of olefinic hydrocarbons such as butylenes, to produce gasoline fractions. When employed in the polymerization of normally gaseous olefins, the formed and calcined particles are generally placed in a vertical, cylindrical treating tower and the olefin-containing gas mixture is passed downwardly therethrough at a temperature of from about 350° to about 550° F. and at a pressure of from about 100 to about 1500 p. s. i. These conditions are particularly applicable when dealing with olefin-containing material such as stabilizer reflux which may contain from approximately 10 to 50% or more of propylene and butylenes. When operating on a mixture comprising essentially butanes and butylenes, this catalyst is effective at conditions favoring the maximum utilization of both normal butylenes and isobutylenes which involves mixed polymerization at temperatures from about 250° to about 325° F. and a pressure of from about 500 to about 1500 p. s. i.

In utilizing the catalyst of this invention for promoting miscellaneous organic reactions, the catalysts will be employed in essentially the same way as they are used when polymerizing olefins in that the reactions are essentially in the vapor phase, and that they also may be employed in suspension in liquid phase in various types of equipment.

With suitable modifications in the details of operation, the present type of catalyst may be employed in a large number of organic reactions including polymerization of olefins as already mentioned. Typical cases of reactions in which the present type of catalyst may be used include the alkylation of cyclic compounds with olefins, the cyclic compounds including aromatics, polycyclic compounds, naphthenes and phenols; condensation reactions such as those occurring between ethers and aromatics, alcohols and aromatics, phenols and aldehydes, etc.; reactions involving the hydrohalogenation of unsaturated organic compounds, isomerization reactions; ester formation by the interaction of carboxylic acids and olefins; and the like. The specific procedures for utilizing the present type of catalyst in miscellaneous organic reactions will be determined by the chemical and physical characteristics and the phase of the reaction constituents.

The present invention is further illustrated with respect to specific embodiments thereof in the following examples which, however, are not intended to limit the generally broad scope of the present invention in strict accordance therewith.

EXAMPLE I

A catalyst for the polymerization of olefinic hydrocarbons was prepared by slurrying 300 g. of alumina gel in 150 cc. of water. 34.2 g. of nickel nitrate hexahydrate in 65 cc. of water was added to the slurry. This composite was mixed for a period of approximately 2 hours, dried at a temperature of approximately 240° F. for 16 hours, formed into 1/8" pills and calcined at 1200° F. for 1 hour. The composite was then reduced with hydrogen at a temperature of about 475° F. at 500 p. s. i. g. This composite was then treated with 15 g. of boron trifluoride, all of the boron trifluoride being adsorbed.

EXAMPLE II

Another catalyst for the polymerization of olefinic hydrocarbons was prepared by slurrying 1200 g. of alumina gel and 600 cc. of water. 92 g. of nickel nitrate hexahydrate and 15 g. of phosphorus pentoxide in 100 cc. of water were added to the slurry. The composite was mixed for a period of approximately 2 hours and adjusted to a pH of 2.5 by the addition of concentrated ammonium hydroxide. The composite was dried, then extruded and formed into 1/8" pills. The dried pills were calcined at 1000° F. for a period of 3 hours in a muffle furnace. Boron trifluoride was passed over the composite at 325° F. until saturated.

Determination of activity

The catalysts prepared in the previous two examples were tested to determine the activity thereof by processing a 1:1 molar ethylene-propylene mixture over these catalysts in a jacketed reactor under conditions noted, results of said tests being set forth in Table I below:

TABLE I

| Catalyst | Temperature, °F. | Pressure, p. s. i. g. | LHSV | Percent Olefin conversion |
|---|---|---|---|---|
| I | 490 | 490 | 3.0 | 61.4 |
| II | 480 | 525 | 3.6 | 31.0 |

I claim as my invention:

1. A process for the manufacture of a solid polymerization catalyst which comprises admixing a metal salt with an acidic oxide of phosphorus, adding said mixture to a solid adsorbent, drying and calcining said composite, and thereafter treating the resultant composite with a boron halide.

2. A process for the manufacture of a solid polymerization catalyst which comprises admixing a metal salt with an acidic oxide of phosphorus, adding said mixture to a solid adsorbent, drying and calcining said composite, and thereafter treating the resultant composite with a boron trifluoride.

3. A process for the manufacture of a solid polymerization catalyst which comprises admixing an aqueous solution of a salt of a metal of group VIII of the periodic table with an acidic oxide of phosphorus, adding said mixture to a solid adsorbent, drying and calcining said composite, and thereafter treating the resultant composite with boron trifluoride.

4. A process for the manufacture of a solid polymerization catalyst which comprises admixing an aqueous solution of a salt of a metal of group VIII of the periodic table with phosphoric acid, adding said mixture to a solid adsorbent, drying and calcining said composite, and thereafter treating the resultant composite with boron trifluoride.

5. A process for the manufacture of a solid polymerization catalyst which comprises admixing an aqueous solution of a salt of a metal of group VIII of the periodic table with phosphoric anhydride, adding said mixture to a solid adsorbent, drying and calcining said composite, and thereafter treating the resultant composite with boron trifluoride.

6. A process for the manufacture of a solid polymerization catalyst which comprises mixing an aqueous solution of a salt of metal of group VIII of the periodic table with a solid adsorbent material, drying and calcining said composite, and thereafter treating the resulting composite with boron trifluoride.

7. A process for the manufacture of a solid polymerization catalyst which comprises admixing an aqueous solution of a nickel salt with phosphoric anhydride, adding said mixture to a solid adsorbent, drying and calcining said composite, and thereafter treating the resultant composite with boron trifluoride.

8. A process for the manufacture of a solid polymerization catalyst which comprises admixing an aqueous solution of a nickel nitrate with phosphoric anhydride, adding said mixture to a solid adsorbent, drying and calcinating said composite, and thereafter treating the resultant composite with boron trifluoride.

9. A process for the manufacture of a solid polymerization catalyst which comprises mixing an aqueous solution of nickel salt with a phosphoric acid, adding said mixture to a solid adsorbent, drying and calcining said composite, and thereafter treating the resultant composite with boron trifluoride.

10. A process for the manufacture of a solid polymerization catalyst which comprises mixing aqueous slurries of silica and alumina, adding said mixture to an aqueous solution of a nickel salt, drying and calcining said composite, and thereafter treating the resultant composite with boron trifluoride.

11. A process for the manufacture of a solid polymerization catalyst which comprises admixing an aqueous solution of nickel nitrate with phosphoric anhydride, adding said mixture to an aqueous slurry of alumina, adjusting the pH of the resultant composite to a value in the range of from about 7 to about 10, drying and calcining said composite, and thereafter treating said composite with boron trifluoride.

12. A process for the manufacture of a solid polymerization catalyst which comprises admixing an aqueous solution of nickel nitrate with phosphoric anhydride, adding said mixture to an aqueous slurry of alumina, adjusting the pH of the resultant composite by means of ammonium hydroxide to a value in the range of from about 7 to about 10, drying and calcining said composite, and thereafter treating said composite with boron trifluoride.

13. A process for the manufacture of a solid polymerization catalyst which comprises admixing an aqueous solution of nickel nitrate with phosphoric anhydride, adding said mixture to an aqueous slurry of alumina, adjusting the pH of the resultant composite by means of ammonium hydroxide to a value in the range of from about 7 to about 10, drying and calcining said composite at a temperature in the range of from about 600° F. to about 1200° F. for a period of time in the range of from about 1 to about 8 hours, and thereafter treating said composite with baron trifluoride.

References Cited in the file of this patent

UNITED STATES PATENTS

| | | |
|---|---|---|
| 2,092,295 | Peski et al. | Sept. 7, 1937 |
| 2,142,980 | Huijser et al. | Jan. 3, 1939 |
| 2,282,602 | Drennan | May 12, 1942 |